(12) United States Patent
Kumar

(10) Patent No.: US 8,280,836 B2
(45) Date of Patent: Oct. 2, 2012

(54) CONVERTING UNORDERED GRAPHS TO OBLIVIOUS READ ONCE ORDERED GRAPH REPRESENTATION

(75) Inventor: Prasun Kumar, Bangalore (IN)

(73) Assignee: Fair Isaac Corporation, Minneapolis, MN (US)

( * ) Notice: Subject to any disclaimer, the term of this patent is extended or adjusted under 35 U.S.C. 154(b) by 723 days.

(21) Appl. No.: 12/206,514

(22) Filed: Sep. 8, 2008

(65) Prior Publication Data

US 2010/0063953 A1 Mar. 11, 2010

(51) Int. Cl.
*G06F 17/00* (2006.01)
*G06N 5/02* (2006.01)

(52) U.S. Cl. ........................................................ 706/50

(58) Field of Classification Search .................. None
See application file for complete search history.

(56) References Cited

U.S. PATENT DOCUMENTS

| | | |
|---|---|---|
| 4,953,106 A | 8/1990 | Gansner et al. |
| 5,515,487 A | 5/1996 | Beaudet et al. |
| 5,528,735 A | 6/1996 | Strasnick et al. |
| 5,537,630 A | 7/1996 | Berry et al. |
| 5,546,529 A | 8/1996 | Bowers et al. |
| 5,603,025 A | 2/1997 | Tabb et al. |
| 5,608,898 A | 3/1997 | Turpin et al. |
| 5,623,541 A | 4/1997 | Boyle et al. |
| 5,644,686 A | 7/1997 | Hekmatpour |
| 5,682,487 A | 10/1997 | Thomson |
| 5,692,107 A | 11/1997 | Simoudis et al. |
| 5,696,885 A | 12/1997 | Hekmatpour |
| 5,701,137 A | 12/1997 | Kiernan et al. |
| 5,701,400 A | 12/1997 | Amado |
| 5,710,896 A | 1/1998 | Seidl |
| 5,720,007 A | 2/1998 | Hekmatpour |
| 5,742,836 A | 4/1998 | Turpin et al. |

(Continued)

FOREIGN PATENT DOCUMENTS

EP 0690367 1/1996

(Continued)

OTHER PUBLICATIONS

Sossa, H. et al.; "Model Indexing: the graph-hashing approach"; 1992; IEEE; IEEE Computer Society Conference on Computer Vision and Pattern Recognition; pp. 811-814.*

(Continued)

*Primary Examiner* — Jeffrey A Gaffin
*Assistant Examiner* — Stanley K Hill
(74) *Attorney, Agent, or Firm* — Mintz, Levin, Cohn, Ferris, Glovsky and Popeo, P.C.

(57) ABSTRACT

Data characterizing a desired variable order and an unordered graph can be received so that all paths in the unordered graph can be enumerated and a first path in the unordered graph can be leveled according to the desired variable order in a first oblivious read once decision graph. For each additional path other than the first path, the additional path is leveled in the desired order, nodes of the additional path are added to the first oblivious read once decision graph, and a union operation is performed on the first oblivious read once decision graph to union graph roots on the first oblivious read once decision graph. Thereafter, generation of a second oblivious read once decision graph can be initiated after completing processing of the first path and each additional path. Related apparatus, systems, techniques and articles are also described.

22 Claims, 7 Drawing Sheets

U.S. PATENT DOCUMENTS

| | | | |
|---|---|---|---|
| 5,745,712 | A | 4/1998 | Turpin et al. |
| 5,787,416 | A | 7/1998 | Tabb et al. |
| 5,796,932 | A | 8/1998 | Fox et al. |
| 5,806,056 | A | 9/1998 | Hekmatpour |
| 5,806,256 | A | 9/1998 | Hekmatpour |
| 5,815,155 | A | 9/1998 | Wolfston, Jr. |
| 5,815,415 | A | 9/1998 | Bentley et al. |
| 5,818,155 | A | 10/1998 | Kawamura et al. |
| 5,822,745 | A | 10/1998 | Hekmatpour |
| 5,870,559 | A | 2/1999 | Leshem et al. |
| 5,870,768 | A | 2/1999 | Hekmatpour |
| 5,875,431 | A | 2/1999 | Heckman et al. |
| 5,890,131 | A | 3/1999 | Ebert et al. |
| 5,917,492 | A | 6/1999 | Bereiter et al. |
| 5,920,873 | A | 7/1999 | Van Huben et al. |
| 5,930,764 | A | 7/1999 | Melchione et al. |
| 5,953,017 | A | 9/1999 | Beach et al. |
| 5,953,707 | A | 9/1999 | Huang et al. |
| 5,958,008 | A | 9/1999 | Pogrebisky et al. |
| 5,966,126 | A | 10/1999 | Szabo |
| 5,966,695 | A | 10/1999 | Melchione et al. |
| 5,974,127 | A | 10/1999 | Wernli et al. |
| 5,982,370 | A | 11/1999 | Kamper |
| 5,987,242 | A | 11/1999 | Bentley et al. |
| 5,999,192 | A | 12/1999 | Selfridge et al. |
| 6,014,138 | A | 1/2000 | Cain et al. |
| 6,073,138 | A | 6/2000 | de l'Etraz et al. |
| 6,078,324 | A | 6/2000 | Phathayakorn et al. |
| 6,088,693 | A | 7/2000 | Van Huben et al. |
| 6,089,453 | A | 7/2000 | Kayser et al. |
| 6,094,654 | A | 7/2000 | Van Huben et al. |
| 6,108,004 | A | 8/2000 | Medl |
| 6,111,578 | A | 8/2000 | Tesler |
| 6,112,202 | A | 8/2000 | Kleinberg |
| 6,134,706 | A | 10/2000 | Carey et al. |
| 6,137,499 | A | 10/2000 | Tesler |
| 6,237,499 | B1 | 5/2001 | McKoy |
| 6,249,768 | B1 | 6/2001 | Tulskie, Jr. et al. |
| 6,259,451 | B1 | 7/2001 | Tesler |
| 6,285,366 | B1 | 9/2001 | Ng et al. |
| 6,292,830 | B1 | 9/2001 | Taylor et al. |
| 6,327,551 | B1 | 12/2001 | Peterson et al. |
| 6,377,259 | B1 | 4/2002 | Tenev et al. |
| 6,396,488 | B1 | 5/2002 | Simmons et al. |
| 6,411,936 | B1 | 6/2002 | Sanders |
| 6,496,208 | B1 | 12/2002 | Bernhardt et al. |
| 6,556,983 | B1 | 4/2003 | Altschuler et al. |
| 6,609,098 | B1 | 8/2003 | DeMarcken |
| 6,646,652 | B2 | 11/2003 | Card et al. |
| 6,738,736 | B1 | 5/2004 | Bond |
| 6,772,139 | B1 | 8/2004 | Smith, III |
| 6,897,885 | B1 | 5/2005 | Hao et al. |
| 7,000,199 | B2 | 2/2006 | Steele et al. |
| 7,171,407 | B2 | 1/2007 | Barton et al. |
| 7,171,618 | B2 | 1/2007 | Harrington et al. |
| 7,257,588 | B2 | 8/2007 | Keith, Jr. |
| 7,346,529 | B2 | 3/2008 | Flores |
| 7,831,526 | B1 | 11/2010 | Crawford et al. |
| 7,932,907 | B2 | 4/2011 | Nachmanson et al. |
| 2001/0049846 | A1 | 12/2001 | Guzzi et al. |
| 2002/0147626 | A1 | 10/2002 | Zagotta et al. |
| 2003/0069869 | A1 | 4/2003 | Gronau et al. |
| 2004/0039619 | A1 | 2/2004 | Zarb |
| 2004/0073442 | A1 | 4/2004 | Heyns et al. |
| 2004/0107131 | A1 | 6/2004 | Wilkerson et al. |
| 2004/0111255 | A1 | 6/2004 | Huerta et al. |
| 2004/0267785 | A1 | 12/2004 | Suontausta et al. |
| 2006/0161560 | A1 | 7/2006 | Khandelwal et al. |
| 2006/0173753 | A1 | 8/2006 | Padmanabhan et al. |
| 2006/0188620 | A1 | 8/2006 | Gutwein et al. |
| 2008/0147584 | A1 | 6/2008 | Buss |
| 2008/0291203 | A1 | 11/2008 | Nachmanson et al. |
| 2009/0192809 | A1 | 7/2009 | Chakraborty et al. |

FOREIGN PATENT DOCUMENTS

| | | |
|---|---|---|
| EP | 0717346 | 6/1996 |
| EP | 0770967 | 5/1997 |
| EP | 0978989 | 2/2000 |
| WO | 93/20510 | 10/1993 |
| WO | 95/12161 | 5/1995 |
| WO | 97/21171 | 6/1997 |

OTHER PUBLICATIONS

Kohavi, Ron et al.; "Oblivious Decision Trees, Graphs, and Top-Down Pruing"; 1995; International Joint Conference on Artificial Intelligence; 7 pages.*

Fekete et al. "Excentric Labling: Dynamic Neighborhood Labeling for Data Visualization," ACM 1999.

Hightower et al. "Graphical Multiscale Web Histories: A Study of PadPrint".

Bederson et al. "A Zooming Web Browser".

Noik "Layout-Independent Fisheye Views of Nested Graphs".

Clark, J., "Customizing Common Controls" Sep. 1997: Dr. Dobbs Journal.

Coffee, Peter "SPSS More Than a Pretty Face" Feb. 1996 PC Week.

Furnas, George W., "Generalized Fisheye Views" 1986 Human Factors in Computing Systems CHI '86 Conference Proceedings.

Lamping, et al. "A Focus+Context Technique Based on Hyperbolic Geometry for Visualization Hierarchies" Xerox Palo Alto Research Center.

Kohavi, "Bottom Up Induction of Oblivious Read-Once Decision Graphs" European Conference on Machine Learning 1994.

Friedman et al. "Finding the Optimal Variable Ordering for Binary Decision Diagrams" ICCC Transactions on Computers, vol. 39, No. 5 May 1990.

Covaliu, Zvi, "Decision Analysis: Concepts, Tools and Promise" Fair Isaac White Paper.

Efron & Tibshirani, *An Introduction to the Bootstrap* (1993).

Brian R. Gaines, "Transforming Rules and Trees into Comprehensible Knowledge Structures," Knowledge Discovery in Databases II. AAAI/MIT Press 1995.

U.S. Appl. No. 11/845,291, filed Aug. 27, 2007, Crawford.

U.S. Appl. No. 12/201,400, filed Aug. 29, 2008, Crawford.

Pook, Stuart, et al. "Context and Interaction in Zoomable User Interfaces," (ACM Press) pp. 227-231 & 317, May 2000, Palermo, Italy.

Sarkar et al. "Graphical Fisheye View of Graphs," ACM 1992.

Bederson et al. "Pad++: A Zoomable Graphical Interface for Exploring Alternative Interface Physics," ACM 1994.

Eiglsperger, et al., "An Efficient Implementation of Sugiyama's Algorithm for Layered Graph Drawing", Journal of Graph Algorithms and Applications, vol. 9, No. 3, pp. 305-325, 2005.

Payne et al., "An Algorithm for Constructing Optimal Binary Decision Trees", IEEE Trans. On Computers, vol. C 26, No. 9, Sep. 1977, pp. 905-916.

\* cited by examiner

CONVERTING UNORDERED GRAPHS TO OBLIVIOUS READ ONCE ORDERED GRAPH REPRESENTATION

TECHNICAL FIELD

The subject matter described herein relates to conversion of unordered graphs to oblivious read once decision graphs.

BACKGROUND

A decision graph is a way to represent a decision process or a strategy. A decision graph structure is composed of nodes and links in which the leaf nodes represent actions to be taken, the interior nodes represent conditions to be tested on variables, and the paths represent conjunctions of conditions that lead to actions. A node, interior or leaf, can be reached from the root through different paths. The number of links between the root and a node is termed the distance of the node for that path.

A test on a variable is introduced into a decision path only when it is significant in the decision process. As a result, not all variables appear in every path and sometimes same variable appears multiple times in a path. Moreover, variables might appear in different order across different paths. FIG. 1 is an example graph 100 that is unordered and has multiple instances of the same variables in a single path. It has four test variables X, Y, Z and W that can take continuous range of numerical values and leaf variable "A" that can take discrete values A1, A2 and A3. The left most path of the graph 110 contains the test for variable X more than once (X<1 and X<0) so the graph is non-read once. The graph is unordered because two paths have conflicting order of variables. The path in the middle 120 has ordering X→Z→W→Y→A and the path on the right side 130 has ordering X→Z→Y→W→A.

SUMMARY

In one aspect, data characterizing a desired variable order and an unordered graph can be received so that all paths in the unordered graph can be enumerated and a first path in the unordered graph can be leveled according to the desired variable order in a first oblivious read once decision graph. For each additional path other than the first path, the additional path is leveled in the desired order, nodes of the additional path are added to the first oblivious read once decision graph, and a union operation is performed on the first oblivious read once decision graph to union graph roots on the first oblivious read once decision graph. Thereafter, generation of a second oblivious read once decision graph can be initiated after completing processing of the first path and each additional path.

Different variations may be implemented. For example, each additional path added to the first oblivious read once decision graph can be in a conjunctive normal form. The first path can be leveled in an empty oblivious read once decision graph. For each additional path, each node can be iterated in bottom up order to determine if the same node already exists in the oblivious read once decision graph. A new node can be added to the oblivious read once decision graph if is determined that such node does not already exist. Two nodes can be considered the same if corresponding node conditions and sub-graph below the two nodes are identical. Hashing techniques can be used to identify isomorphic sub-graphs. Adding nodes for each additional path can result in two root nodes in the oblivious read once decision graph so that the union operation merges two root nodes and child nodes reachable from the root nodes such that there is only one root node in the oblivious read once decision graph and the child conditions of a parent are not overlapping. The merging can performed such that any two nodes having same subgraph are replaced with a new node with a condition that is union of the conditions of the replaced nodes. The paths can be enumerated by a depth first traversal.

In an interrelated aspect, data characterizing a desired variable order and an unordered graph can be received. Thereafter, all paths in the unordered graph can be enumerated. Each path can be recursively leveled according to the desired variable order using a template oblivious read once decision graph. Subsequently, finalization of the oblivious read once decision graph that includes all of the leveled paths can be initialized.

Articles are also described that comprise a machine-readable storage medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. With conventional techniques, conversion of an unordered graph to an OODG required traversing through all the "atomic condition" node paths (DNF paths) and adding the paths present in the unordered input graph to the OODG. With the increase in the number of variables and their atomic conditions, the paths to be processed become huge and substantially more than the number of paths in the original unordered graph. The current subject matter provides an OODG conversion algorithm that processes the same number of the paths available in the input graph. The algorithm works by induction where every path of the input graph is converted to a leveled read once path and then added to the OODG which was created by adding all the previous paths. The final graph after adding all the paths is functionally equivalent to the input decision graph and also has the oblivious and read-once property.

For the example in FIG. 1, the variable X has four atomic conditions, Y has two atomic conditions, Z has three atomic conditions and W has two atomic conditions. Using a conventional approach 48 paths (4×2×3×2=48) will be processed while only 12 paths will be processed using the current algorithm (which is four times less than conventional approaches). More significant improvements can be seen for medium to large graphs because of increase in the number of variables and atomic conditions for each variable.

The details of one or more variations of the subject matter described herein are set forth in the accompanying drawings and the description below. Other features and advantages of the subject matter described herein will be apparent from the description and drawings, and from the claims.

DESCRIPTION OF DRAWINGS

Like reference symbols in the various drawings indicate like elements.

DETAILED DESCRIPTION

Figure 6:
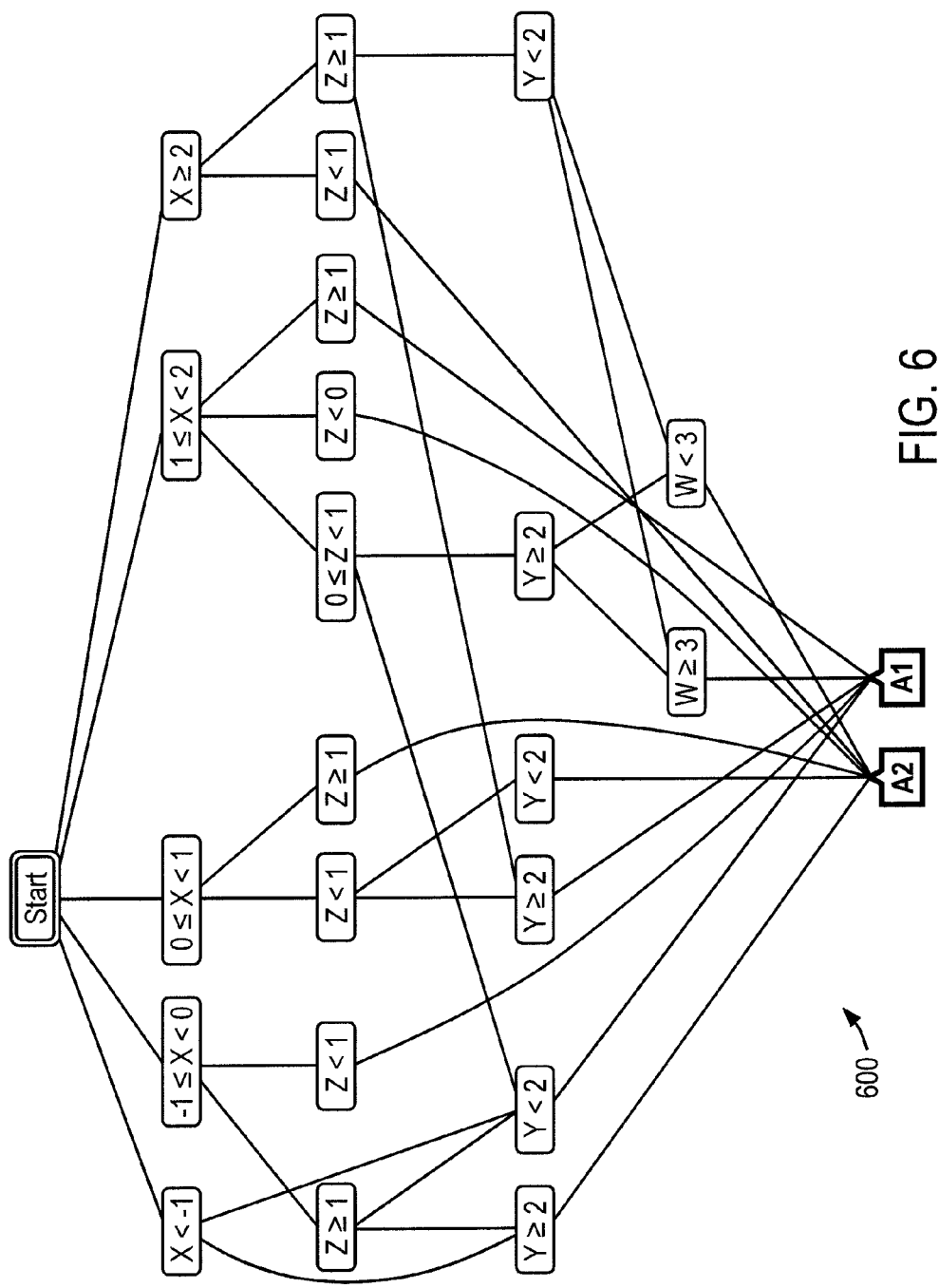
FIG. 6 is an oblivious read once decision graph corresponding to the unordered graph of FIG. 1.

Operations in a decision management system can be simple to perform if test variables appear at most once in a path and are in the same order in all the paths. As a result, nodes of the same variable are always at the same distance from the root whichever path is used to reach the node. The distance from the root to the nodes of a variable is also called "level" of the node and such graphs are called leveled read-once decision graphs. An oblivious read once decision graph (OODG) is a leveled read once decision graph where the child test conditions of the same parent do not overlap or conflict. An oblivious read once decision graph can be easier to comprehend, modify and visualize than other types of decision graphs. FIG. 6 is an OODG 600 corresponding to the graph 100 in FIG. 1. The order of the graph 600 is X→Z→Y→W→A.

A domain defines the set of values that a variable can take. This set can be finite or infinite. A set of integers from 1 to 50 is an example of finite domain set, and a set of real numbers are example of infinite domain set. Domain can take continuous range numerical values or discrete values.

A set of conditions (possibly overlapping) for the same variable can be broken into smallest possible set of non overlapping conditions such that any condition in the old set can be created by combining conditions from the new set. These sets of non overlapping conditions are called "atomic conditions".

A node can be broken into nodes of "atomic conditions", nodes such that for all values that were true for the original node are true for one of the "atomic condition" nodes, then such a split is called "atomic split". An example illustrates this below:

If the initial set of nodes are, X>−1, X<=1, X>0 and X<=2, the atomic splits will then be: X<=−1, −1<X<=0, 0<X<=1, 1<X<=2 and X>2. Note that, X>−1 in the older set can be created by combining −1<X<=0, 0<X<=1, 1<X<=2 and X>2 from the new set. Also X<=1 can be created by combining X<=−1, −1<X<0 and 0<=X<1. The atomic split set given above is the minimal set as no other non-overlapping set containing fewer nodes can form all the nodes of the old set.

A disjunctive normal form (DNF) path is a path in which each node belongs to an atomic split node of that variable.

A conjunctive normal form (CNF) path is a path in which the nodes are not necessarily the atomic split node but a combination of various atomic split nodes. As each node in CNF path spans more space of domain values than DNF path, CNF representation is more compact than a DNF representation of logic.

An algorithm to generate an OODG from an arbitrary decision graph can use an incremental approach of adding decision paths to an existing OODG structure while maintaining the OODG property. Paths added to an existing OODG can be in a CNF representation as opposed to a DNF representation. The logic represented using CNF is a much more compact and hence the number of paths traversed is considerably reduced compare to DNF representation. The compactness advantage of CNF over DNF increases with the number of variables used in the path. A path addition algorithm can be wrapped around a fast and memory efficient data structure that can use bit vectors to save the content of the graph and can use hashing for finding isomorphic sub-graphs for creating OODG.

As an example, an Input Decision graph is I, the output OODG is O and given variable order is V. An example overview of an algorithm can include:

1. Enumerate all the paths of the Input Graph I.

2. Initialize OODG: Initially O is empty. Convert the first path p from I to a leveled read once path by reordering variables in the given order V and assign that to O.

3. Add all the other paths to OODG by repeating step 3.1 to 3.3 for every path p in I.

3.1 Convert the path p to a leveled read once path by reordering variables in the given order V.

3.2 Add path p to O. Iterate nodes in path p in bottom up order and for each node try to find if the node already exists in OODG O. If it does not exist add a new node. Two nodes are considered same, if the node conditions and sub-graph below them are also same.

3.3 After step 3.2, there can be two roots in the graph and this has to be corrected to satisfy oblivious read once property. The two roots and the nodes reachable from these two roots have to be merged such that there is only one root node in the graph and the child conditions of a parent are not overlapping.

4. Once all the paths are added to O, it is the desired OODG for the input graph I.

Figure 1:
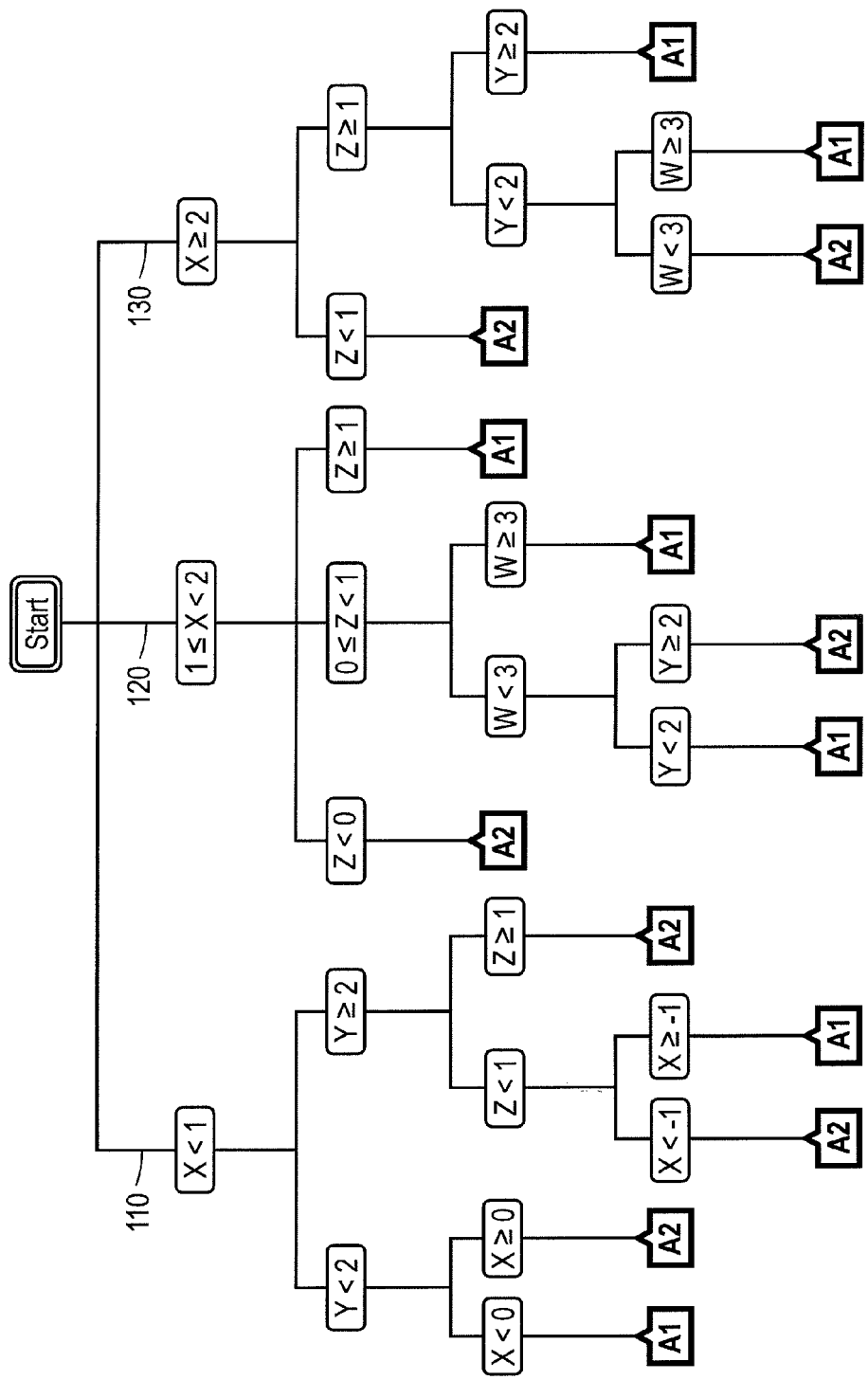
FIG. 1 illustrates an unordered graph with a total of twelve paths.

The input to the algorithm can be an unordered graph I and the desired variable order V of the OODG. FIG. 1 has an example input graph 100 that is used to explain the steps of the algorithms. In the example, the variables take only continuous numerical test values but the same algorithm works for discrete values of the test variables. For the example, the desired OODG ordering is X→Z→Y→W→A (Action will be always at the leaf).

Step 1: Enumerate all the paths of the Input Graph I. This can be done by performing a depth first traversal of the input graph I.

Step 2: Initialize OODG: Initially OODG O is empty and it needs to be initialized. The first path p in I is converted to a leveled read once path of the given variable order V and assigned to O to initialize it. As each single leveled read once path is an OODG in itself, the first path can be just assigned to OODG O to initialize it.

Sub Step 2.1: Converting a path p to level read once path in the given order V:

Multiple test nodes of the same variable in the path can be combined to one node by intersecting the condition space. After this all the nodes in the path can be reordered to be consistent with the desired order V and "True nodes" can be introduced for the variables not present in the path. This gives a leveled read-once path in the desired order.

The left most path 110 (X<1)→(Y<2)→(X<0)→A1 from FIG. 1 example will get converted to (X<0)→(−∞<Z<∞)→(Y<2)→(−∞<W<√)→A1.

Note that the two nodes with tests of variable X can be combined to one node and the ordering is maintained as X→Z→Y→W. The missing nodes from the input path have been introduced as a true node.

Step 3: Add all the remaining paths to the OODG O. Repeat sub steps 3.1 to 3.3 for every path p in Input graph I.

Sub Step 3.1: Convert path p to a leveled read once path of the given order V. This can be done using the sub-step 2.1 described above.

Sub Step 3.2: Add the nodes of path p to OODG. Iterate nodes in path p in bottom up order and for each node try to find if the same node already exists in O. Two nodes are considered same, if node conditions and the sub-graph below them are also same. If the node exists, there is no need to add. If the same node does not exist, add this node to O and connect it to its child in O. The child of the newly added node would exist in O because iteration occurs in a bottom-up manner and the child node is added or found before the node itself.

Figure 2:
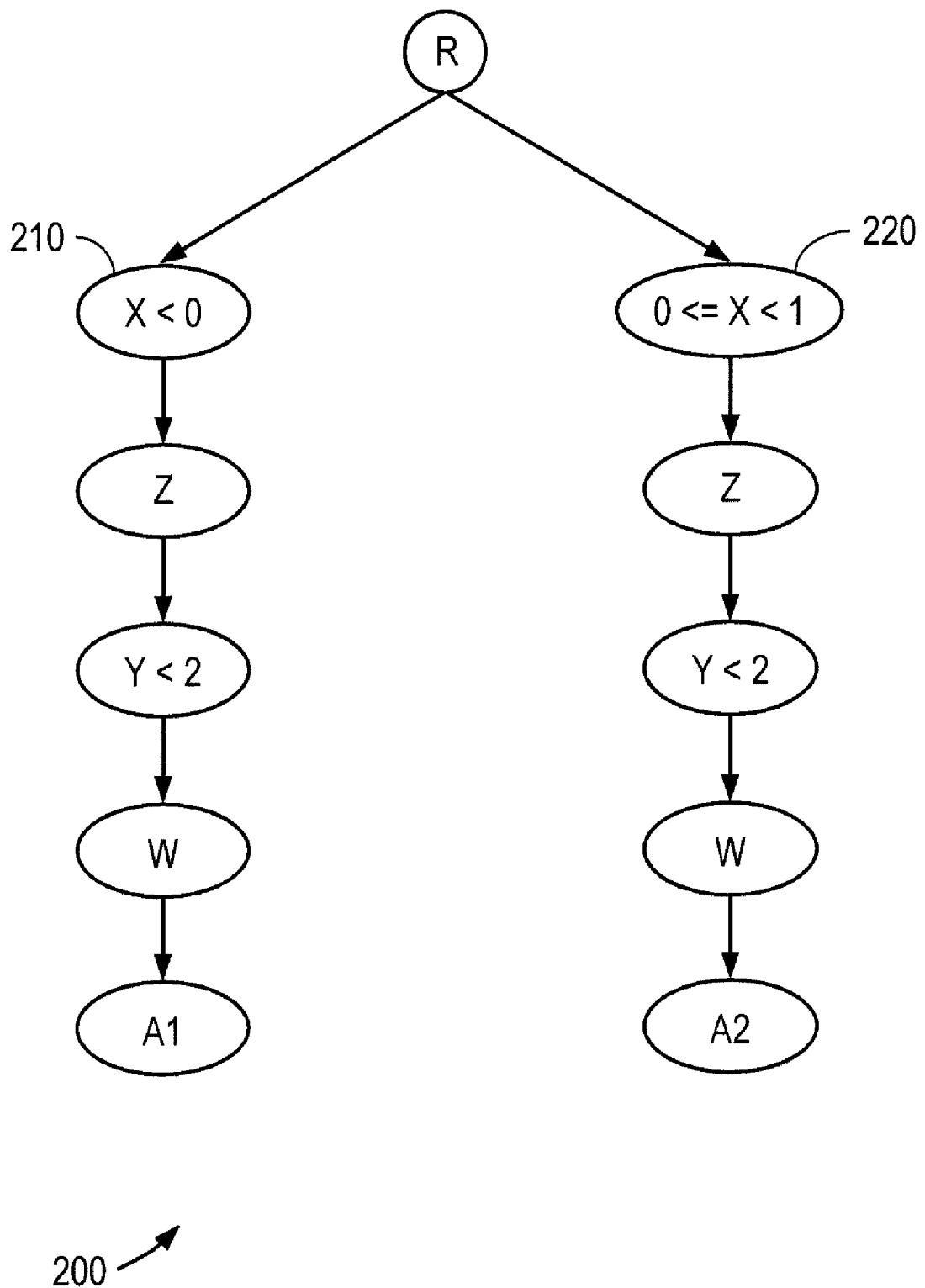
FIG. 2 is a first oblivious read once decision graph.

Step 3.2 can be illustrated using an example. Assume that the following two paths have been added and the resultant OODG 200 is illustrated in FIG. 2.

Path 1 (210): (X<0)→(−∞<Z<∞)→(Y<2)→(−∞<W<∞)→A1

Path 2 (220): (0<X<1)→(−∞<Z<∞)→(Y<2)→(−∞<W<∞)→A2

For the sake of brevity, any test of a variable which spans the complete space i.e. (−∞, ∞) would be just denoted by the name of the variable. For example, instead of writing (−∞<Z<∞) Z is written in the path.

In this step the leveled path (−1<=X<1)→(Z<1)→(Y>=2)→(W)→A1 can be added to the OODG 200 of FIG. 2. This is a partial step and the result of this step is not an OODG.

The nodes of the path can be considered in bottom-up fashion and those in the OODG can be found. If not found those nodes are created. Below is order of finding nodes:

a. Action Node "A1" and no child node: Found in left subgraph.

b. Node with condition "W" and "A1" as child Node: Found in left subgraph.

c. Node with condition Y>=2 and "W->A1" as child subgraph.: Not found in the left subgraph, so a node is created with "Y>=2" and connected to existing child subgraph: W->A1.

d. Node with condition Z and "Y>=2→W→A1" as child subgraph.: Not found in the left subgraph, so a node is created with "Z" and connected to existing child subgraph: Y>=2→W→A1.

e. Node with condition X<1 and "Z→Y>=2→W→A1" as child subgraph: Not found so a node is created "X<1" and connected to child node "Y>=2" created in step d.

f. Root node with child subgraph "(X<1)→Z→(Y>=2)→(W)→A1": Not Found so created and connected to child node "X<1" found in step e.

Figure 3:
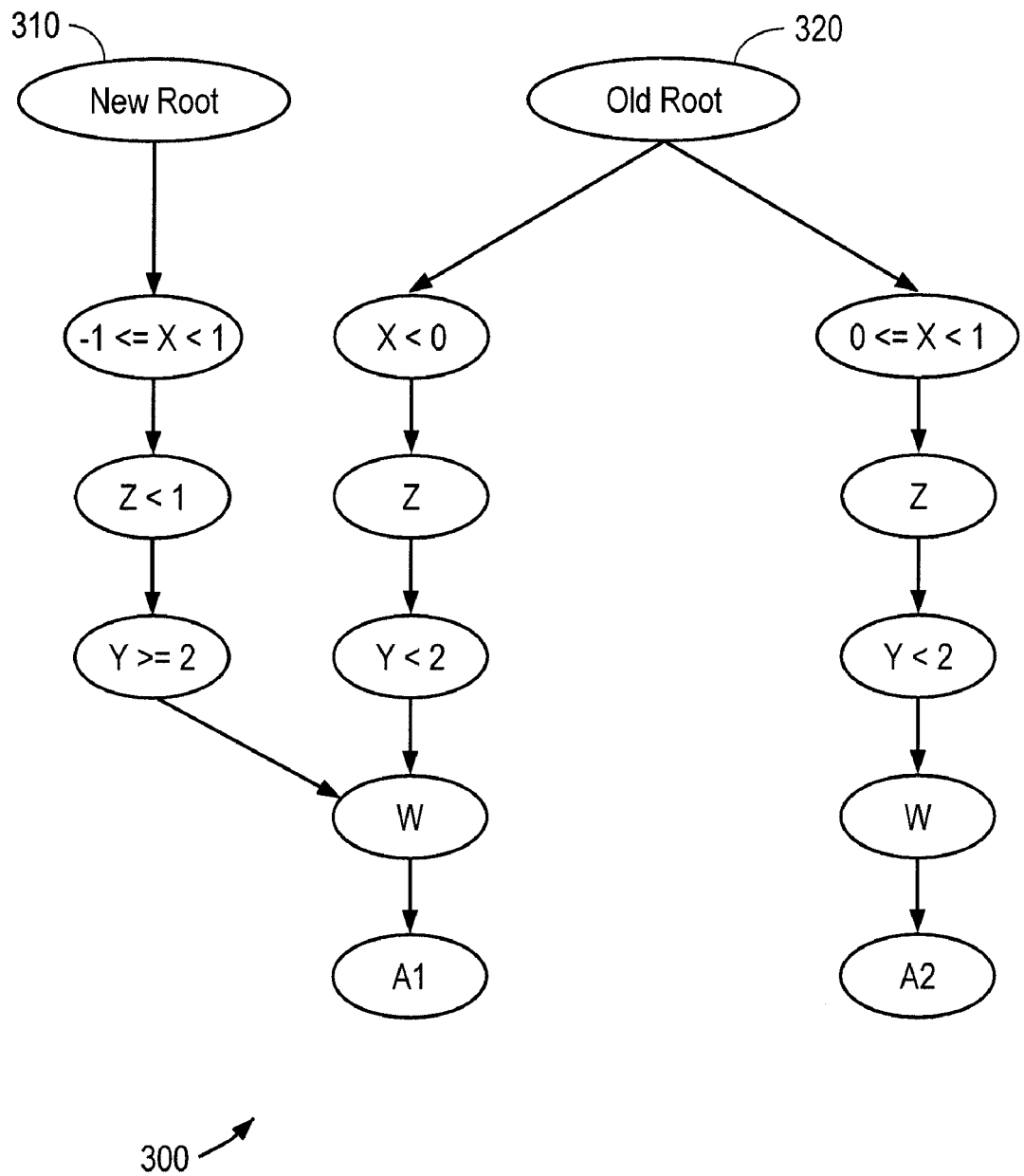
FIG. 3 is a graph resulting from the addition of a path to the first oblivious read once decision graph of FIG. 2.

The resultant graph 300 is shown in FIG. 3 and note that it is not an OODG. It has more than one root nodes and the conditions for variable X are overlapping. "−1<=X<1" with "X<0", "−1<=X<1" with "0<=X<1". Because of overlapping conditions, the root nodes cannot simply be merged to convert to an OODG because it will introduce ambiguity in the graph.

Sub Step 3.3: Correct the graph to satisfy Oblivious-read-once property: The resultant graph after step 3.2, has two roots in the graph and this has to be corrected to satisfy oblivious read once property. This step performs the logical "union operation" on the two roots and the nodes reachable from these two roots. This results in an OODG with only one root node and no overlapping child conditions of any parent.

Logical union operation is started at the two roots and done recursively for the subgraphs of the two roots, till leaf nodes are reached. Below a recursive "union operation step" is explained in connection with the graph 300 of FIG. 3 used earlier in step 3.2.

3.3.1 Union operation step. The input to the union operation is the two subgraphs that have to be unioned. The two root nodes will have the same condition. The immediate children of these roots can be referred to as "child nodes". For example in FIG. 3, union operations are performed on the two subgraphs rooted at "New Root" and "Old Root". As the root node is a dummy node, the two root nodes will be considered to be of the same condition.

The output can be a union subgraph which will have only one root R. Root node R will have the same condition as the root nodes of the input subgraphs. For the example in diagram 300 of FIG. 3, a graph with only one node "Root" as shown in the diagram 500 of FIG. 5 can be sought.

Below are various substeps for a "union operation step":

3.3.1.1 Split child nodes in atomic conditions nodes: The set of nodes formed by the children of the two roots can be broken into atomic splits. Next, the newly created atomic split nodes can be connected to the children and parent nodes of the original child node. In the example, the nodes of variable X can be divided in atomic nodes: "X<−1", "−1<=X<0", "0<=X<1" as depicted in the diagram of FIG. 4.

3.3.1.2 Identify child nodes with the same conditions: From the "atomic condition" child nodes, all child nodes that have the same condition in the two subgraphs can be identified. These are child nodes with domain values present in both the subgraphs and can be a pair. These pairs can be referred to as "common value node pairs". The remaining child nodes which have condition values present in one of the subgraph but not in both can be called "extra value nodes".

Figure 4:
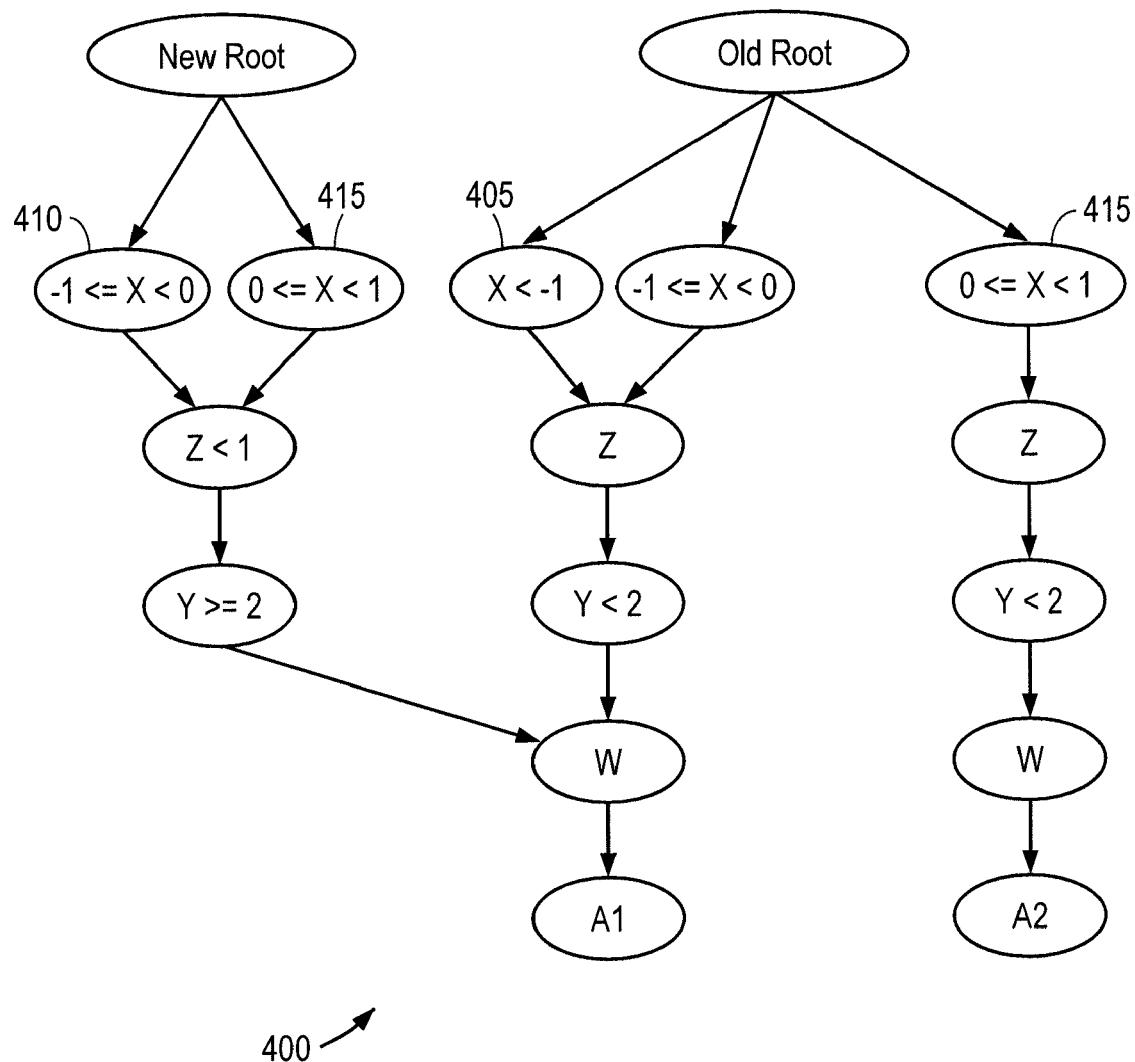
FIG. 4 is a diagram illustrating a division of a nodes for a variable into atomic nodes.

For the example in FIG. 4:

"Extra Value Nodes": node "X<−1" of the "Old root"

"Common Value Node Pairs" are:

Pair #1: "−1<=X<0" under "New Root" and "Old Root"

Pair #2: "0<=X<1" "New Root" and "Old Root"

3.3.1.3 Create union subgraph:

a. Create a new root node R with the same condition as input subgraph root nodes.

b. Disconnect all the nodes identified as "extra value nodes" from their root and connect to R. These nodes have no overlapping domain values so these will not create any conflict.

c. The child nodes in "common value nodes pairs" can not be simply connected to new root R, because they have same conditions and this will cause conflict. To remove the conflict, subgraph rooted at the two child nodes of every pair can be unioned and then connected to R. This can be done by calling "union operation step" for every pair with input arguments as the subgraphs rooted at the two nodes in the pair. The call to "union operation step" results in recursion. The termination step for the recursion is the special case when the child nodes are the leaf nodes and the "union operation" step will not be called, but instead just return a leaf node with the unioned value.

Figure 5:
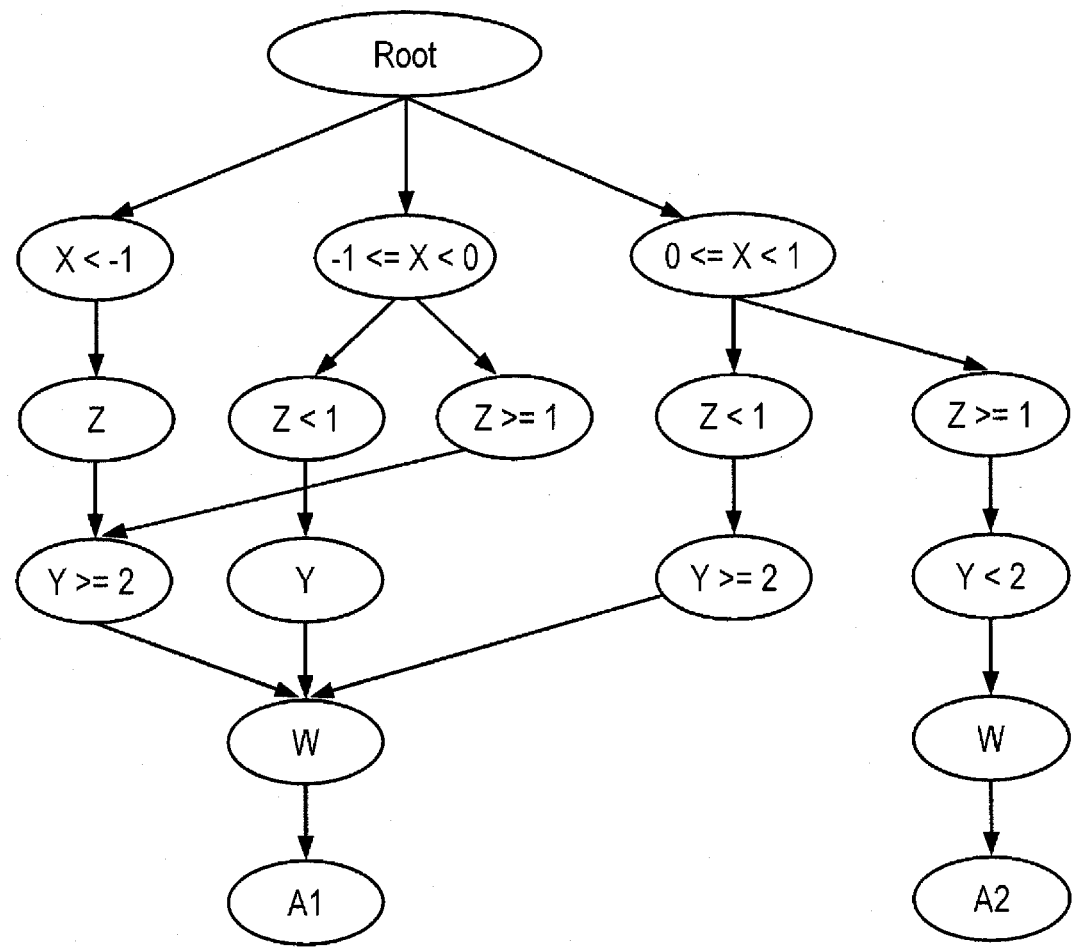
FIG. 5 illustrates the first oblivious read once graph after a union operation merging the new root and old root nodes.

In the example, "common value node pairs" have two pairs so that the union operation step will be called one time for each pair and the output subgraphs will be connected to "Root" as shown in the diagram 500 of FIG. 5.

3.3.1.4 Merge the child nodes of the new root R: Any two nodes that have the same subgraph can be replaced with a new node with a condition that is union of the conditions of the replaced nodes. It should be noted merging step is not mandatory to get an oblivious read once graph, but this step helps in removing redundancies.

In the example above, there is no merging required because none of the child nodes of R has the same subgraph. The merging step can be explained using another example at level "Y" which can be reached during recursive union step of the two subgraphs:

Z<1→Y>=2→W→A1

Z<1→Y<2→W→A1

And as a result, the following subgraph can be obtained:

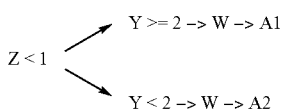

The child list contains the node Y>=2 and Y<2 with the same subgraphs (W→A1) and these can be merged which results in Z<1→Y→Z→W→A1

3.3.1.5 Return the subgraph rooted at R and this is the union sub-graph for the two input subgraphs. "Union operation" step can be applied recursively after each path is added to the OODG O in step 3.2.

Step 4: Once all the paths are added to O, it is the desired OODG for the input graph. The final OODG in the order X→Z→Y→W→A is shown in FIG. 6.

The content of the node can be implemented as a bit vector which ensures faster implementation of operations like intersect, union, and the like on two nodes. A variable X from above example which have atomic conditions, X<0, 0<=X<1, 1<=X<2, X>=2, can be represented by a bit vector on size 4. A bit vector '1001' means X>=2 or X<0, '0011' means X<1 etc. Hence, if a variable have less that 32 atomic splits then that can be represented by a primitive integer available in most of the languages and operations like union or intersect will just be bitwise OR and AND operations. The bit vector representation also makes the implementation more memory efficient.

Hashing techniques can be used to improve the performance of finding nodes and comparing nodes in steps 3.2 and 3.3. Hash functions can be defined for every node and for a every subgraph. Hashing of subgraph is possible by using a proper hash function which maps hash functions of all the nodes of a subgraph to a final hash code. The criteria to be fulfilled is a. The hash code algorithm is deterministic. Given the same subgraph it should always result in the same hash code.

b. If two sub-graphs have different hash code they should never be isomorphic.

c. Two sub-graphs with same hash code can still be different and to test that recursion on the subgraph would be required.

A major part of the computation in steps 3.2 and 3.3 is the find node and comparison subgraphs operations which can be done in constant time O(1) using the bit vectors and hashing approach described above.

The implementation of the proposed algorithm with bit vector and hashing techniques, has given good improvements in time and memory. Using conventional approaches, conversion to OODG for smaller trees with 9 variables used to take at least 30 seconds and for large trees with more than 12 variables conversion can take several hours. Using the current algorithm, conversion can take place in 1 second and less than 5 seconds respectively.

Complete Recursion steps of the Union Operation in step 3.3.1 The complete recursion steps for union operation are shown below with an example. The input is the graph in the diagram 300 of FIG. 3 and the output is in the diagram 500 of FIG. 5.

Recursion Step 1
Input:
Subgraph 1: Rooted at node "New Root"
Subgraph 2: Rooted at node "Old Root".
Sub-Step 1: Split child nodes in atomic conditions nodes:
The atomic conditions are: "X<-1", "-1<=X<0", "0<=X<1", "X>=1"
Subgraph1 child Node "-1<=X<1" is split into "-1<=X<0" and "0<=<1"
Subgraph2 child node "X<0" is split into "X<-1" and "-1<=X<0"
The newly created split nodes are connected to the original node's parent and children.
Sub Step 2: Identify child nodes with the same conditions:
"Extra Value Nodes": node "X<-1" in Subgraph2
"Common Value Node Pairs" are:
Pair #1: Node "-1<=X<0" in Subgraph1 and Subgraph2
Pair #2: "0<=X<1" in Subgraph1 and Subgraph2
Sub-Step 3: Create union subgraph.
Create new root node "Root"
Connect "X<-1" to the "Root" node.
The two subgraphs rooted at "-1<=X<0" are unioned and the returned subgraph is connected to the "Root" node. (Recursion Step 1.1).
The two subgraphs rooted at "0<=X<1" are unioned and the returned subgraph is connected to the "Root" node. (Recursion Step 1.2).
Recursion Step 1 is now put on hold till recursion step 1.1 and 1.2 are completed.
Recursion Step 1.1
Input:
Subgraph 1: Rooted at node "-1<=X<0" of the "new root" graph.
Subgraph 1: Rooted at node "-1<=X<0" of the "old root" graph.
Sub-Step 1: Split child nodes in atomic conditions nodes:
The atomic conditions are: "Z<1", "Z>=1"
Subgraph1 child Node "Z<1" is already in atomic condition
Subgraph2 child node "-√<Z<∞" is split into "Z<1" and "Z>=1"
The newly created split nodes are connected to the original node's parent and children.
Sub Step 2: Identify child nodes with the same conditions:
"Extra Value Nodes": node "Z>=1" in Subgraph2
"Common Value Node Pairs" are:
Pair #1: Node "Z<1" in Subgraph1 and Subgraph2
Sub-Step 3: Create union subgraph.
Create new root node "-1<=X<0"
Connect "Z>=1" to the "-1<=X<0" node.
The two subgraphs rooted at "Z<1" are unioned and the returned subgraph is connected to the "-1<=X<0" node. (Recursion Step 1.1.1).
Recursion step 1.1 is put on hold till recursion step 1.1.1 is completed.
Recursion Step 1.1.1
Input:
Subgraph 1: "Z<1" node of the "New Root" graph (with child Y>=2->W->A1).
Subgraph 2: "Z<1" node of the "Old Root" graph. (with child Y<2->W->A1).
Sub-Step 1: Split child nodes in atomic conditions nodes:
The atomic conditions are: "Y<2", "Y>=2"
Subgraph1 child Node "Y>=2" is already in atomic condition
Subgraph2 child node "Y<2" is already in atomic condition
Sub Step 2: Identify child nodes with the same conditions:
"Extra Value Nodes": node "Y>=2" in Subgraph1 and "Y<2" in Subgraph2
"Common Value Node Pairs" are: None
Sub-Step 3: Create union subgraph.
Create new root node "Z<1"
Connect "Y>=2" and "Y<2" to the "Z<1" node.

Sub Step 4: Merge the child nodes: The two nodes of Y with condition "Y>=2" and "Y<2" can be merged since the subgraph below it is same. So the resultant merged path is
Z<1→Y→W→A1

Sub Step 5: Return subgraph rooted at "Z<1" which is Z<1→Y→W→A1

Recursion Step 1.1 (Resumed)
Sub step 3 (Resumed):
The subgraph from recursion step 1.1.1 is connected to parent "-1<=X<0" and the final graph after this step is:

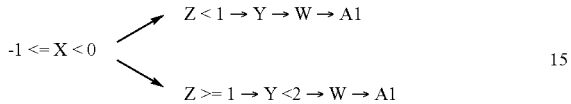

Sub Step 4: Merge the child nodes: No merging done
Sub Step 5: Return subgraph rooted at "-1<=X<0" which is same as the above subgraph before merge.
Recursion Step 1.2
Input:
Subgraph1: "0<=X<1" node of the new root graph.
Subgraph2: "0<=X<1" node of the old root graph.
Sub-Step 1: Split child nodes in atomic conditions nodes:
The atomic conditions are: "Z<1", "Z>=1"
Subgraph1 child Node "Z<1" is already in atomic condition
Subgraph2 child node "-∞<Z<∞" is split into "Z<1" and "Z>=1"
The newly created split nodes are connected to the original node's parent and children.
Sub Step 2: Identify child nodes with the same conditions:
"Extra Value Nodes": node "Z>=1" in Subgraph2
"Common Value Node Pairs" are:
Pair #1: Node "Z<1" in Subgraph1 and Subgraph2
Sub-Step 3 Create unioned subgraph.
Create new root node "0<=X<1"
Connect "Z>=1" to the "0<=X<1" node.
The two subgraphs rooted at "Z<1" are unioned and the returned subgraph is connected to the "0<=X<1" node. (Recursion Step 1.2.1).
Recursion step 1.1 is put on hold till recursion step 1.2.1 is completed.
Recursion Step 1.2.1
Subgraph 1: "Z<1" node of the "New Root" graph (with child Y>=2->W->A1).
Subgraph 2: "Z<1" node of the "Old Root" graph. (with child Y<2->W->A2).
Sub-Step 1: Split child nodes in atomic conditions nodes:
The atomic conditions are: "Y<2", "Y>=2"
Subgraph1 child Node "Y>=2" is already in atomic condition
Subgraph2 child node "Y<2" is already in atomic condition
Sub Step 2: Identify child nodes with the same conditions:
"Extra Value Nodes": node "Y>=2" in Subgraph1 and "Y<2" in Subgraph2
"Common Value Node Pairs" are: None
Sub-Step 3: Create unioned subgraph.
Create new root node "Z<1"
Connect "Y>=2" and "Y<2" to the "Z<1" node.
Sub Step 4: Merge the child nodes: No merging done.
Sub Step 5: Return subgraph rooted at "Z<1" which is

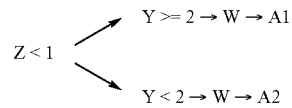

Recursion Step 1.2 (Resumed)
Sub step 3 (Resumed):
The subgraph from recursion step 1.2.1 is connected to parent "0<=X<1" and the final graph after this step is:

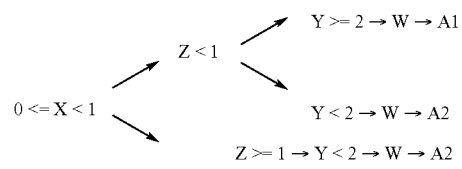

Sub Step 4: Merge the child nodes: No merging done
Sub Step 5: Return subgraph rooted at "0<=X<1" which is same as the above subgraph before merge.
Recursion Step 1 (Resumed). The subgraph from recursion step 1.1 and 1.2 are connected to parent "Root" and the final graph after this step is

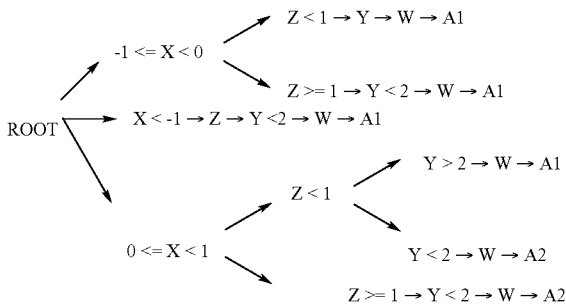

Sub Step 4: Merge: Merge the child nodes: No merging done
Sub Step 5: Return subgraph rooted at "Root".
Note that the nodes at level Y and below are not involved in recursion. This is because the nodes of variable Y in the two subgraphs don't have any common domain value. This means that the recursion only goes until depth of 2.

Figure 7:
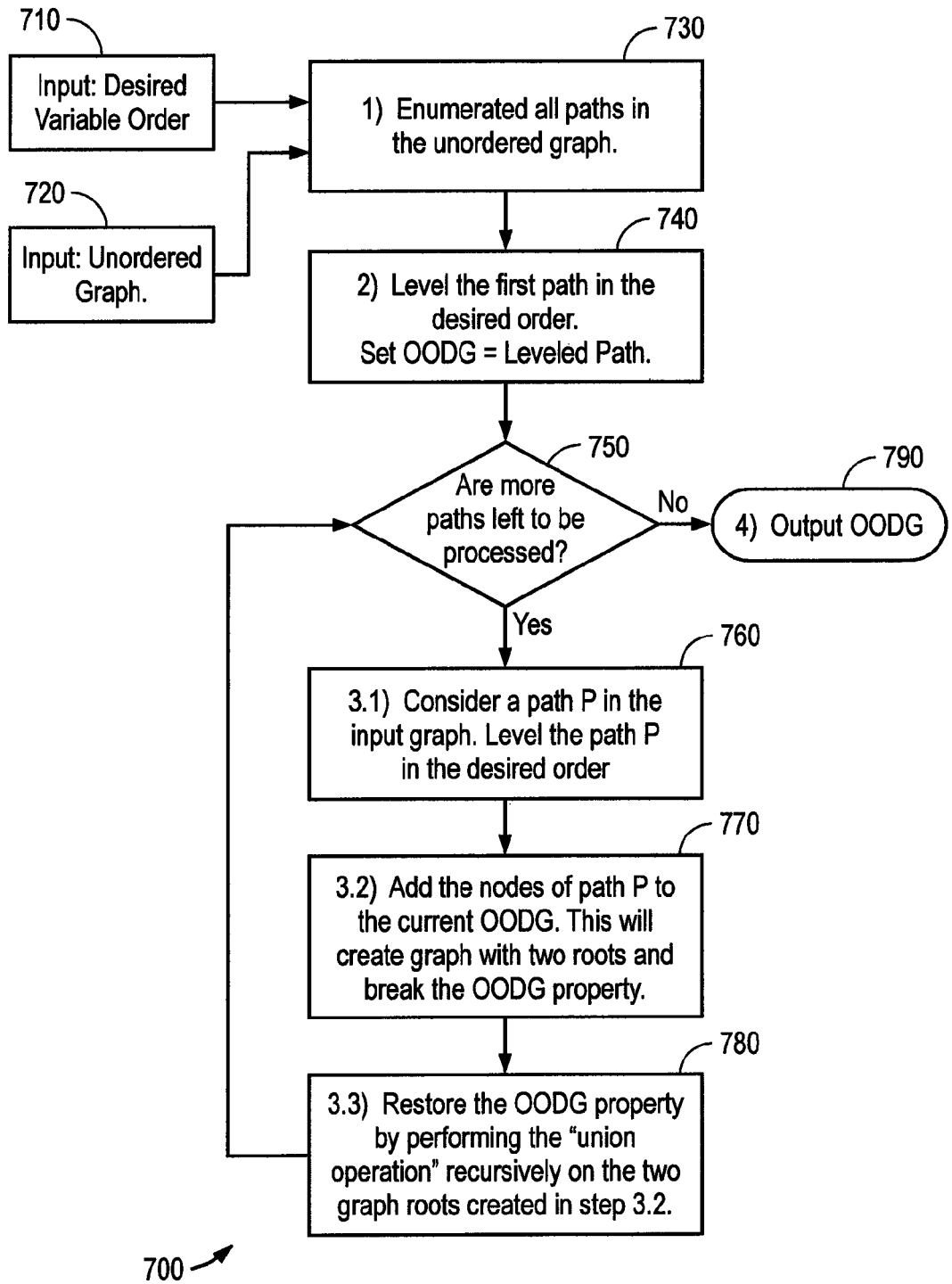
FIG. 7 is a process flow diagram illustrating techniques for generating an oblivious read once decision graph.

FIG. 7 is a process flow diagram 700 illustrating various aspects of the algorithm described herein. Desired variable order (710) and an unordered graph (720) can be both be provided so that, at 730, all paths in the unordered graph can be enumerated (corresponding to step 1 above). Thereafter, at 740, the first path is leveled in the desired order (corresponding to step 2 above). It is then determined, at 750, if there are more paths left to be processed. If not, then, at 790, an OODG is output. Otherwise, at 760, a path p in the input graph is considered so that path p can be leveled in the desired order (corresponding to step 3.1 above). Nodes of path p are added, at 770, to a current OODG (corresponding to step 3.2 above) thereby resulting in a graph with two roots that breaks the OODG property. The OODG property is restored, at 780, by performing a union operation recursively on the two graph roots created at 770 (corresponding to step 3.3 above). Steps 3.1 to 3.3 are repeated until there are no more paths left to be processed.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. Other embodiments may be within the scope of the following claims.

What is claimed is:

1. An article comprising a tangible machine-readable storage medium embodying instructions that when performed by one or more machines result in operations comprising:

receiving data characterizing a desired variable order and an unordered graph;

enumerating all paths in the unordered graph;

leveling, in an oblivious read once decision graph, a first path in the unordered graph according to the desired variable order; and for each additional path in the unordered graph other than the first path, leveling the additional path in the desired order, adding nodes of the additional path to the oblivious read once decision graph, and performing a union operation on the oblivious read once decision graph to union graph roots on the oblivious read once decision graph.

2. An article as in claim 1, wherein each additional path added to the first oblivious read once decision graph is in a conjunctive normal form.

3. An article as in claim 1, wherein the first path is leveled in an empty oblivious read once decision graph.

4. An article as in claim 1, wherein the storage medium further embodies instructions that when performed by one or more machines result in operations comprising:

for each additional path, iterating each node in bottom up order to determine if same node already exists in the oblivious read once decision graph.

5. An article as in claim 4, wherein the storage medium further embodies instructions that when performed by one or more machines result in operations comprising:

adding a new node to the oblivious read once decision graph if is determined that such node does not already exist.

6. An article as in claim 4, wherein two nodes are considered same if corresponding node conditions and sub-graph below the two nodes are identical.

7. An article as in claim 6, wherein hashing techniques are used to identify isomorphic sub-graphs.

8. An article as in claim 1, wherein adding nodes for each additional path results in two root nodes in the oblivious read once decision graph, and wherein the union operation merges two root nodes and child nodes reachable from the root nodes such that there is only one root node in the oblivious read once decision graph and the child conditions of a parent are not overlapping.

9. An article as in claim 8, wherein the merging is performed such that any two nodes having the same subgraph are replaced with a new node with a condition that is union of the conditions of the replaced nodes.

10. An article as in claim 1, wherein the paths are enumerated by a depth first traversal.

11. A computer-implemented method comprising:

receiving data characterizing a desired variable order and an unordered graph;

enumerating all paths in the unordered graph;

leveling, in an oblivious read once decision graph, a first path in the unordered graph according to the desired variable order; and for each additional path in the unordered graph other than the first path, leveling the additional path in the desired order, adding nodes of the additional path to the oblivious read once decision graph, and performing a union operation on the oblivious read once decision graph to union graph roots on the oblivious read once decision graph.

12. A method as in claim 11, wherein each additional path added to the first oblivious read once decision graph is in a conjunctive normal form.

13. A method as in claim 11, wherein the first path is leveled in an empty oblivious read once decision graph.

14. A method as in claim 11 further comprising:
for each additional path, iterating each node in bottom up order to determine if same node already exists in the oblivious read once decision graph.

15. A method as in claim 14 further comprising:
adding a new node to the oblivious read once decision graph if is determined that such node does not already exist.

16. A method as in claim 14, wherein two nodes are considered same if corresponding node conditions and sub-graph below the two nodes are identical.

17. A method as in claim 16, wherein hashing techniques are used to identify isomorphic sub-graphs.

18. A method as in claim 11, wherein adding nodes for each additional path results in two root nodes in the oblivious read once decision graph, and wherein the union operation merges two root nodes and child nodes reachable from the root nodes such that there is only one root node in the oblivious read once decision graph and the child conditions of a parent are not overlapping.

19. A method as in claim 18, wherein the merging is performed such that any two nodes having the same subgraph are replaced with a new node with a condition that is union of the conditions of the replaced nodes.

20. A method as in claim 11, wherein the paths are enumerated by a depth first traversal.

21. An article comprising a non-transitory machine-readable storage medium embodying instructions that when performed by one or more machines result in operations comprising:
receiving data characterizing a desired variable order and an unordered graph;
enumerating all paths in the unordered graph; and
recursively leveling, for an oblivious read once decision graph, each enumerated path according to the desired variable order.

22. An article as in claim 21, wherein the storage medium further embodies instructions that when performed by one or more machines result in operations comprising:
combining root nodes of the oblivious read once decision graph.

* * * * *